US012763553B2

(12) United States Patent
Heilersig

(10) Patent No.: US 12,763,553 B2
(45) Date of Patent: Oct. 13, 2026

(54) COMPACT SWITCHING APPARATUS

(71) Applicant: EATON INTELLIGENT POWER LIMITED, Dublin (IE)

(72) Inventor: Dinant Heilersig, Overijssel (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 132 days.

(21) Appl. No.: 18/609,244

(22) Filed: Mar. 19, 2024

(65) Prior Publication Data

US 2024/0332920 A1 Oct. 3, 2024

(51) Int. Cl.

*H02B 1/20* (2006.01)
*H01H 33/662* (2006.01)
*H01H 33/666* (2006.01)
*H02B 13/01* (2006.01)

(52) U.S. Cl.

CPC ............. *H02B 1/20* (2013.01); *H01H 33/662* (2013.01); *H01H 33/6661* (2013.01); *H02B 13/01* (2013.01)

(58) Field of Classification Search

CPC ........ H01H 1/42; H01H 31/003; H01H 31/28; H01H 33/662; H01H 33/6661; H01H 9/48; H02B 1/20; H02B 13/01

See application file for complete search history.

(56) References Cited

U.S. PATENT DOCUMENTS 4,813,019 A 3/1989 Shimazu et al.
4,864,899 A 9/1989 Morse
9,425,006 B2 * 8/2016 Attar ...................... H01H 33/91
2002/0060204 A1 5/2002 Tohya et al.
2004/0104201 A1 * 6/2004 Sato ................... H02B 13/0354 218/118
2005/0121418 A1 * 6/2005 Yano .................... H02B 13/045 218/7
2006/0034037 A1 * 2/2006 Lammers ............. H01H 33/022 361/647
2006/0138088 A1 * 6/2006 Meinherz ................. H02B 5/06 218/119

(Continued)

FOREIGN PATENT DOCUMENTS

CN 101340066 A 1/2009
CN 101340066 B * 9/2010 ........... H01H 31/003

(Continued)

*Primary Examiner* — Timothy J Thompson
*Assistant Examiner* — Rhadames Alonzo Miller
(74) *Attorney, Agent, or Firm* — LEYDIG, VOIT & MAYER, LTD.

(57) ABSTRACT

A switching apparatus and a switching system are provided. The switching apparatus comprises an insulating housing comprising a housing wall, a disconnector disposed inside the insulating housing and at least partially surrounded by the housing wall, an insulated branch busbar disposed outside the insulating housing, such that part of the housing wall is disposed between the disconnector and the insulated branch busbar, an insulated connection element passing through the housing wall connecting the second end of the disconnector to the insulated branch busbar, and an insulated phase busbar connected to the branch busbar. The switching system comprises a plurality of switching apparatuses.

17 Claims, 4 Drawing Sheets

(56) References Cited

U.S. PATENT DOCUMENTS

| | | | | |
|---|---|---|---|---|
| 2006/0245128 | A1* | 11/2006 | Dambietz | H02B 5/06 361/62 |
| 2007/0175866 | A1* | 8/2007 | Tsuchiya | H02B 13/0354 218/10 |
| 2008/0007896 | A1* | 1/2008 | Tsuchiya | H02B 13/01 361/612 |
| 2008/0217153 | A1* | 9/2008 | Bottcher | H01H 33/6661 200/48 R |
| 2009/0111324 | A1* | 4/2009 | Hughes | H01R 13/6599 439/607.02 |
| 2012/0061352 | A1* | 3/2012 | Shimizu | H01H 1/385 218/147 |
| 2013/0240485 | A1* | 9/2013 | Yabu | H02B 13/0354 218/139 |
| 2013/0292358 | A1* | 11/2013 | Hu | H01H 33/42 218/5 |
| 2016/0043532 | A1* | 2/2016 | Zende | H02B 13/025 361/611 |
| 2016/0044823 | A1* | 2/2016 | Bhattacharya | H05K 7/20009 29/592.1 |
| 2016/0049775 | A1* | 2/2016 | Saxegaard | H01H 1/44 361/618 |
| 2016/0064171 | A1* | 3/2016 | Attar | H01H 33/66207 218/139 |

FOREIGN PATENT DOCUMENTS

| | | | |
|---|---|---|---|
| EP | 0140515 | A2 | 5/1985 |
| EP | 1054493 | B1 | 11/2000 |
| EP | 1160946 | A1 | 12/2001 |
| GB | 1263070 | A | 2/1972 |
| GB | 2198383 | A | 6/1988 |
| GB | 2264889 | A | 9/1993 |
| GB | 2278565 | A | 12/1994 |
| GB | 2610444 | A | 3/2023 |
| WO | WO 9323207 | A1 | 11/1993 |

* cited by examiner

COMPACT SWITCHING APPARATUS

The present application relates to an air-insulated switching apparatus for use in medium-voltage and high-voltage applications.

Medium-voltage and high-voltage electrical distribution apparatuses often use gas insulation, such as $SF_6$, to provide compact devices that avoid current flow between elements at different potential differences. Due to negative environmental effects associated with $SF_6$, there is a desire to provide electrical distribution components that do not rely on gas insulation.

An alternative to gas-insulated apparatuses are air-insulated apparatuses, in which high-voltage and medium-voltage components are surrounded by air, such as the switchgear disclosed in US 20060034037 A1. In such apparatuses, additional design considerations are necessary to prevent failure events that are effectively prevented when using $SF_6$ insulating gas. A particular problem is the generation of flashover events, in which the breakdown of air causes flow of electrons from a high voltage region to ground. These events typically occur when large voltages are applied to the system, such as during a lightning strike or transient voltage surge. In order to avoid such flashover events, air-insulated electric apparatuses may include large separation distances between elements or complex arrangements of insulating materials.

There is a need, therefore, for compact arrangements of electrical distribution components that avoid electrical flashover events.

SUMMARY OF INVENTION

In one aspect of the disclosure, a switching apparatus is provided. The switching apparatus comprises: an insulating housing, the insulating housing comprising a housing wall; a disconnector disposed inside the insulating housing and at least partially surrounded by the housing wall, the disconnector having a first end and a second end, wherein the first end of the disconnector receives power from a power supply; an insulated branch busbar disposed outside the insulating housing, such that part of the housing wall is disposed between the disconnector and the insulated branch busbar; an insulated connection element passing through the housing wall and connecting the second end of the disconnector to the insulated branch busbar; and an insulated phase busbar connected to the branch busbar.

In some examples, the disconnector comprises a moveable conductive element that forms a conductive path between the first and second ends of the disconnector when the moveable conductive element is in a closed position and which disconnects the first and second ends of the disconnector when the moveable conductive element is in an open position.

In some examples, the apparatus comprises a ground contact disposed within the insulating housing and electrically connected to ground, wherein, when the disconnector is in the open position, the second end of the moveable conductive element is in contact with the ground contact.

In some examples, the apparatus comprises a circuit breaking device disposed between the first end of the disconnector and the power supply.

In some examples, the circuit breaking device comprises a vacuum interrupter.

In some examples, the apparatus comprises at least one shielding element disposed around an end of the disconnector.

In some examples, the housing is formed of a plastic material or epoxy.

In some examples, the insulated connection element comprises a bushing.

In some examples, the branch busbars are surrounded by an insulating thermoplastic elastomer material.

In some examples, the housing comprises an opening to allow air to flow into and out of the housing.

In another aspect of the disclosure, a switching system is provided. The switching system comprises a plurality of switching apparatuses in accordance with the first aspect of the disclosure.

In some examples, the insulating housings of the respective switching apparatuses of the plurality of switching apparatuses all have the same shape.

In some examples, the branch busbars of the respective switching apparatuses of the plurality of switching apparatuses all have a different shape to each other.

In some examples, the branch busbars of the respective switching apparatuses of the plurality of switching apparatuses extend in mutually different directions

DETAILED DESCRIPTION OF THE INVENTION

The present invention provides a switching apparatus. The switching apparatus may be used as part of an air-insulated switching system for high-voltage and medium-voltage power distribution such as a switchgear.

Figure 1:
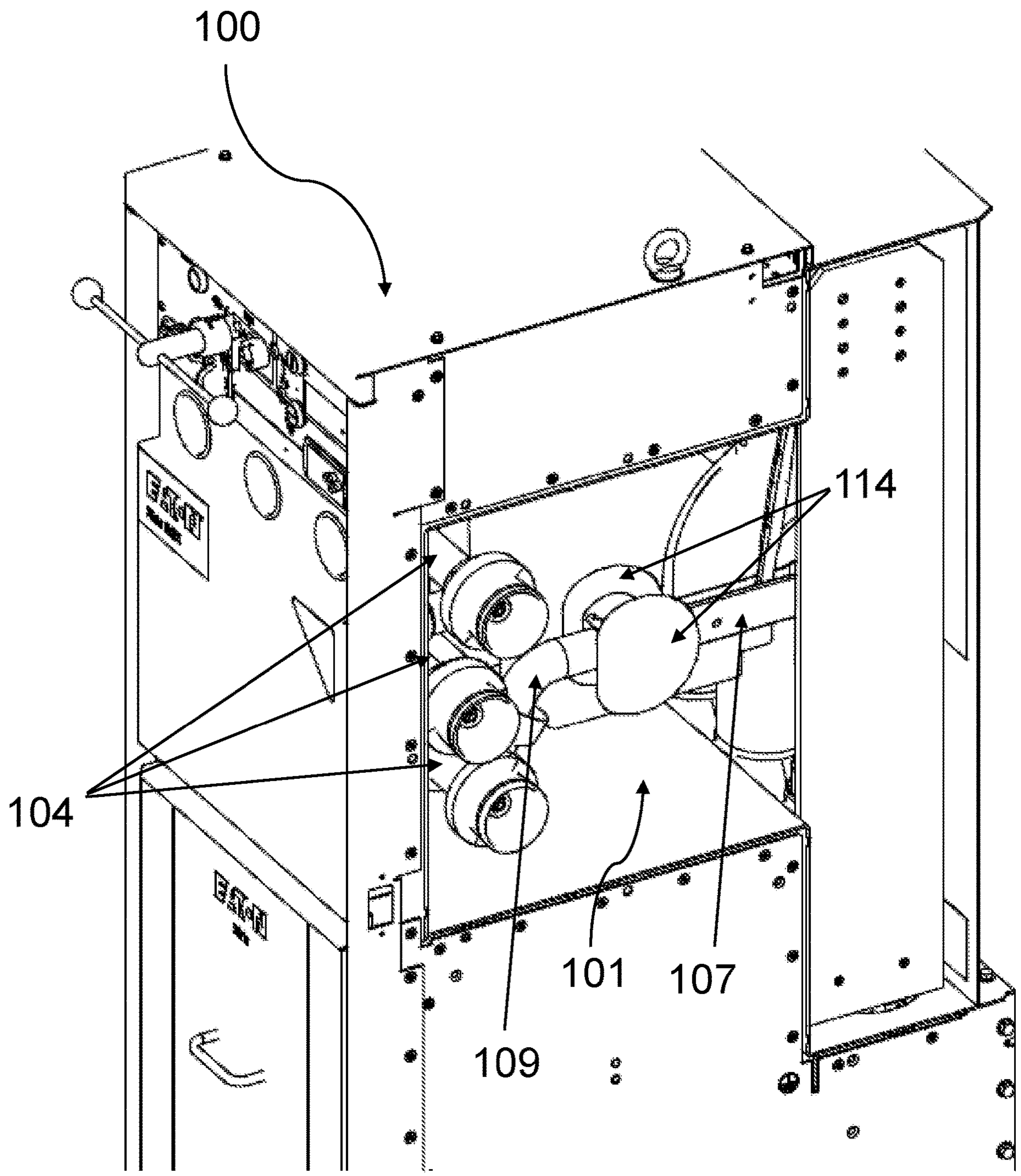
FIG. 1 shows an illustration of an apparatus including a switching system in accordance with an embodiment.
Figure 2:
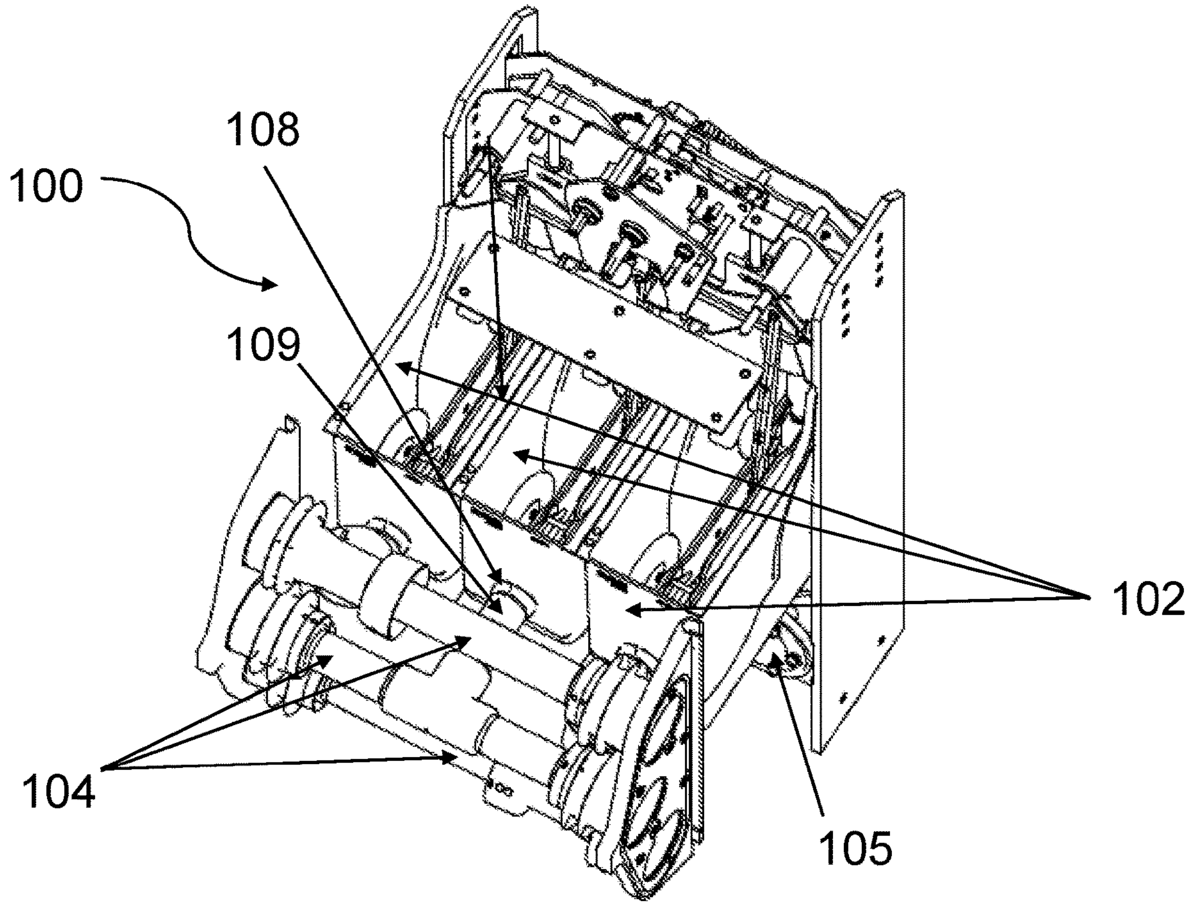
FIG. 2 shows an illustration of a switching system according to the embodiment.
Figure 3:
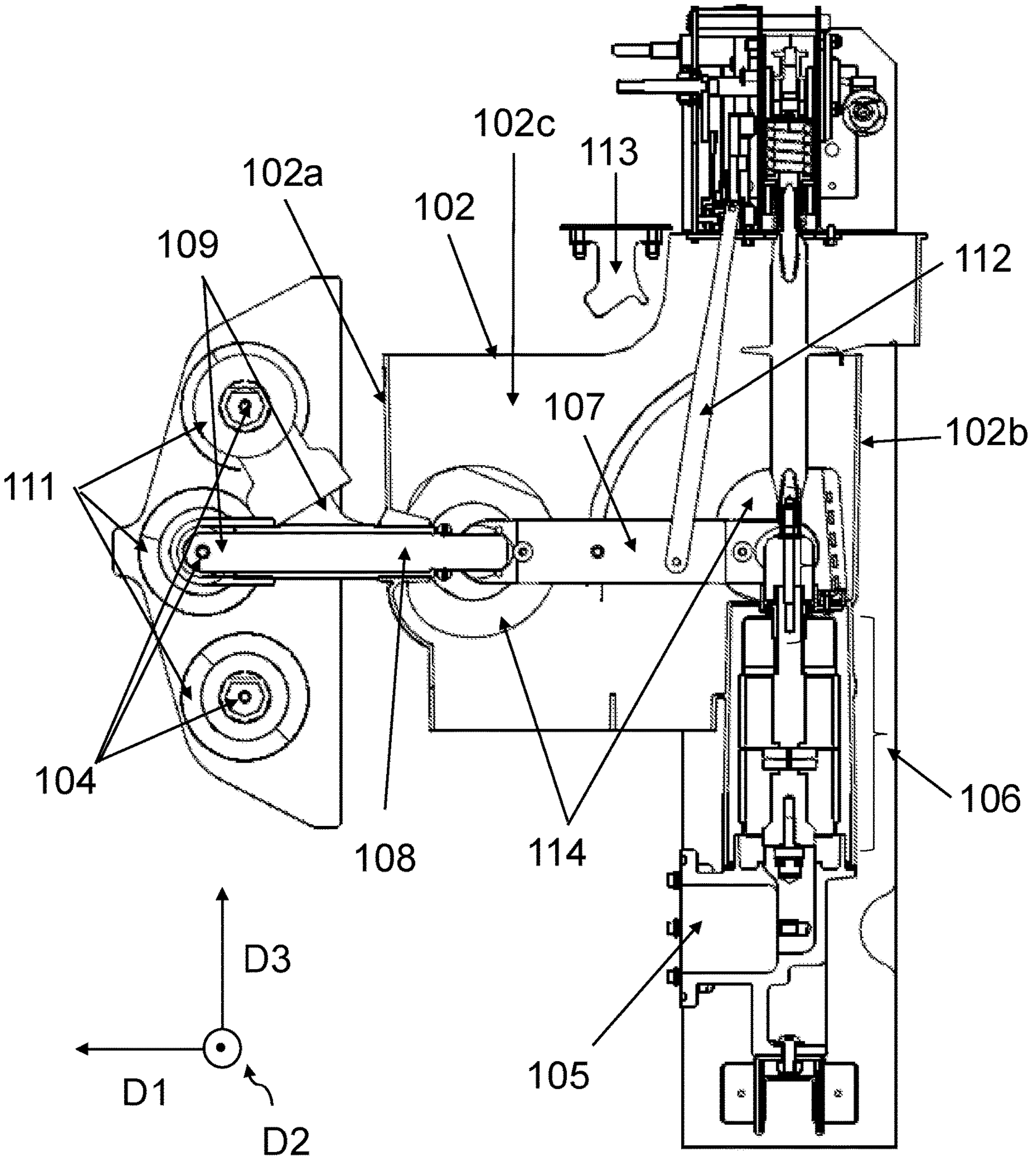
FIG. 3 shows a cross-sectional view of a witching system according to the embodiment.

FIGS. 1-3 illustrate a switching system 100 comprising three switching apparatuses 101 for use in a medium-voltage and high-voltage power supply according to embodiments of the invention. The switching system 100 provides an electrical connection between a power supply line and phase busbar elements (or phase busbars) of a three-phase busbar system. Actuation of one or more elements of the switching system 100 can disconnect the power supply from the conductive busbar elements. In the description below, the term switching apparatus 101 describes the components connecting a power supply to one phase busbar element. In the illustrated embodiments, three such switching apparatuses 101 are arranged side-by-side in a switching system 100 to provide electrical connection to different phase busbars 104 of a three phase power supply system. It should be understood that embodiments of switching systems may include a single switching apparatus 101 as described below or another number of switching apparatuses 101.

The switching apparatus 101 comprises an insulating housing 102, preferably made from plastic, epoxy, or another non-metallic material. The housing 102 partially encloses elements of the switching apparatus 101. A cable connection 105 is configured to receive a power supply cable for providing or receiving current at high or medium voltage. The cable connection 105 is electrically connected to a first end of a circuit breaking device 106, such as a vacuum interrupter. The second end of the circuit breaking device 106 is electrically connected to the first end of a disconnector 107. In this way the power supply is connected to the first end of the disconnector 107 via the circuit breaking device 106. The circuit breaking device 106 and the disconnector 107 are disposed within and partially surrounded by the insulating housing 102. However, in some implementations there may be no circuit breaking device 106 and the power supply is connected to the first end of the disconnector 107 either directly or via one or more other intermediate components (not shown), as appropriate.

The second end of the disconnector 107 is connected to an insulated connection element 108 that passes through the wall of the housing. The insulated connection element 108 may, for example, be a conductive element surrounded by a bushing. The insulated connection element 108 is connected to an insulated phase busbar 104 via an insulated branch busbar 109. As such, the insulated branch busbar and phase busbar are separated from the elements within the housing by the housing wall. The phase busbar 104 and branch busbar 108 are formed of copper, or another suitable conductor, and are insulated with a thermoplastic elastomer material 111 that entirely surrounds the conductive material. In some embodiments, the phase busbar 104 and branch busbar 109 may be surrounded by another suitable insulating material. In other words, the insulated branch busbar is formed by surrounding a conductive branch busbar with an insulating material. The conductive element of the insulated connection element 108 and the conductive element of the insulated branch busbar 109 may be integrally formed in some embodiments.

The disconnector 107 comprises a moveable conductive element 117, preferably formed of copper, that can be opened or closed using a mechanical actuator 112. When the moveable conductive element 117 is opened, the first end of the moveable conductive element 117 remains connected to the circuit breaking device (or the power supply when there is no circuit breaking device), while the second end of the moveable conductive element 117 is disconnected from the insulated connection element 108. In a fully opened position, the second end of the moveable conductive element of the disconnector is connected to a ground contact 113, which allows the electrical circuit to be grounded. In some embodiments, the disconnector can be a three position switch in which the moveable conductive element of the disconnector may not be connected to the ground contact or the insulated connection element 108. A phase busbar 104 can therefore be disconnected from the power supply by opening the disconnector 107 using the mechanical actuator 112. The ground contact 113 is disposed within the insulating housing 102 such that the housing wall is disposed between the ground contact and the branch busbar 109.

Disc-shaped field-controlling shields 114 are mounted on either side of the moveable conductive element 117 of the disconnector 107. The disk-shaped shields 114 each comprise a metal disk positioned in a holder made from insulating material. The shields 114 are responsible for electric field shaping in the vicinity of open contacts of the disconnector 107 and are configured to avoid regions of excessively high field strength that could result in flashover events.

The housing 102 at least partially surrounds the disconnector 107, the mechanical actuators 112, the ground contact 113, the shields 114, the circuit breaking device 106 and part of the insulated connection element 108. The branch busbar 108 and phase busbars 104 are disposed outside of the housing 102. The housing 102 is substantially cuboidal and comprises a housing wall including a front face 102*a* and a back face 102*b* separated from each other in a first direction D1 and two side faces 102*c* separated from each other in a second direction D2 (which is into the page in the cross-sectional view of FIG. 3) perpendicular to the first direction. As the switching apparatus 101 is air-insulated, top and bottom portions of the housing may be open, allowing air to pass in and out of the housing. By using an insulated branch bus bar (as compared to e.g. a bare branch busbar, which can be a greater source of free electrons), flashovers may be reduced without needing to close the housing using a cap. The front face 102*a* of the housing wall is disposed between the disconnector 107 and the branch busbars 109 and phase busbars 104. The front face 102*a* of the housing has a hole formed therethrough, and the insulated connection element 108 passes through the hole in the first direction. The insulated connection element 108 is connected to a phase busbar 104 via a branch busbar 109.

In a three phase switching system 100, three switching apparatuses 101 are arranged in the second direction such that side wall 102*c* of the housings of adjacent switching apparatuses 101 face each other, as shown in FIGS. 1 and 2. The elements that are surrounded by the housings 102, and/or the housing 102 itself, may be identical in each of the three switching apparatuses. Each switching apparatus 101 is connected to a respective phase busbar 104. The phase busbars 104 may be arranged in third direction D3 perpendicular to the first and second directions (i.e. a vertical direction as shown in the cross-section of FIG. 3) and extend in the second direction. Each switching apparatus 101 is connected to a different phase busbar 104 via its respective branch busbar 109. As seen in FIGS. 1-3, the branch busbar 104 of one switching apparatus 101 may extend substantially in the second direction, while branch busbars 104 of the other two switching 101 apparatuses may bend upwards and downwards respectively to connect to respective phase busbars 109. In other words, the branch busbars 104 all have a different shape to each other and extend in different directions to one another.

The arrangement of the switching apparatus of FIGS. 1-3 in which insulated branch busbars 109 are disposed outside of an insulating housing 102 provides improved protection from flashover events in power frequency voltage or lightning impulse voltage conditions in comparison with known switchgear apparatuses.

The switching apparatus is arranged to provide conditions both inside and outside of the insulating housing 102 that combine to reduce the likelihood of flashover events.

Outside the Insulating Housing

Outside the insulating housing 102, electrical conductors are fully insulated in regions where the electrical field strength is relatively high.

The electrical field strength in the vicinity of the branch busbar 109 and insulated connection element 108 can exceed the dielectric strength (or "withstand level") of air during lighting impulse and power frequency voltage conditions. This high electric field strength can result in the production of free electrons, which can in turn increase the chance of undesired flashovers. This free electron production can be prevented by fully insulating the branch busbar 109 and the insulated connection element 108 outside the housing.

Inside the Insulating Housing

Inside the insulating housing 102, production of free electrons can be reduced or avoided by reducing the electrical fields to an acceptable level by means of proper electrical field control. Full insulation is not generally possible inside the insulating housing 102.

In the vicinity of the relatively low electrical fields that are typically generated at most regions inside the insulating housing, free electrons are not produced and, thus, no undesired flashover will occur.

Figure 4A:
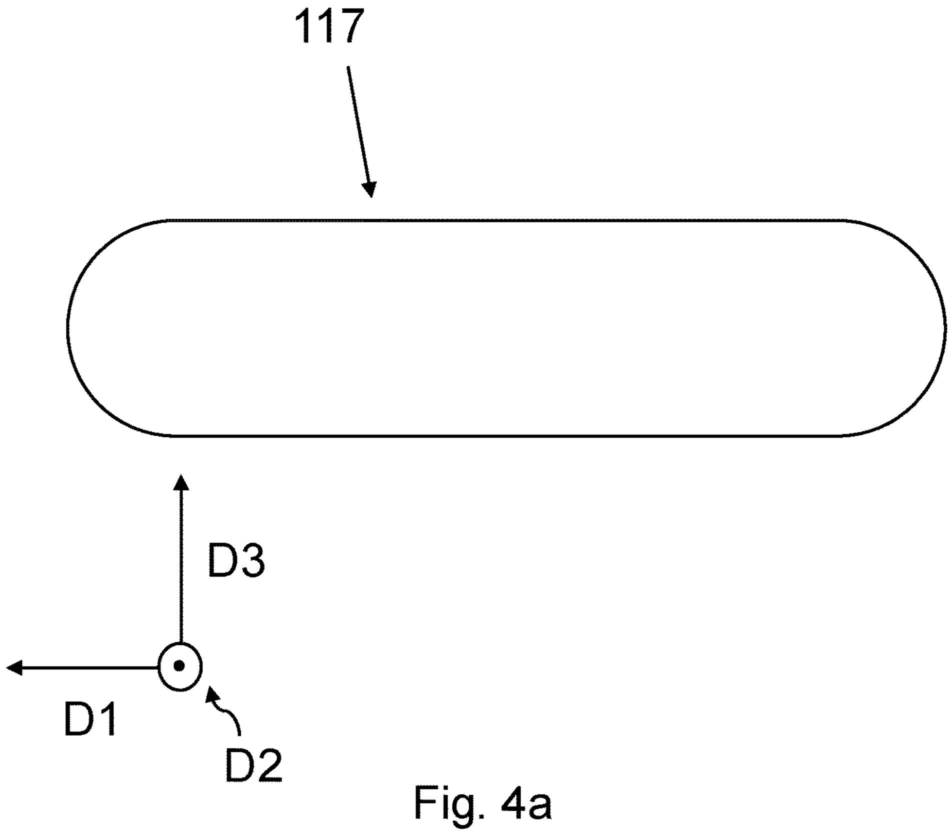
FIGS. 4*a* and 4*b* show cross-sectional views of a moveable conductive element of a disconnector according to the embodiment.
Figure 4B:
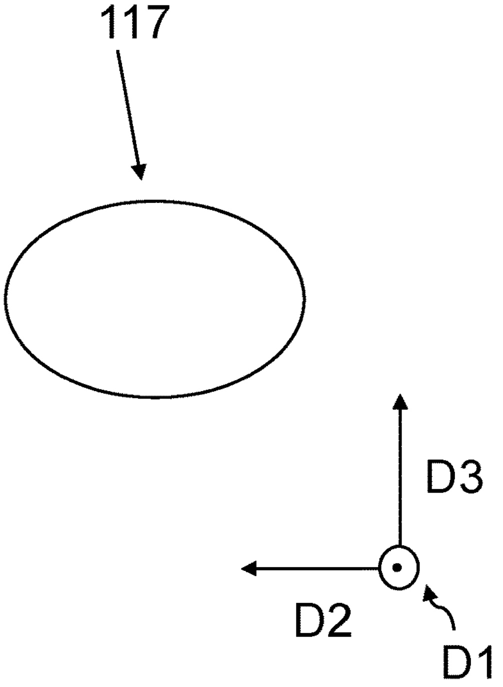

The moveable conductive element 117 of the disconnector is shaped such that the electrical field strength in the vicinity of the bare disconnector 107 is relatively low. In particular, the moveable conductive element 117 is smoothly shaped to avoid discontinuities on its surface. Preferably, when viewed in profile (i.e. along the second direction in the embodiment shown in FIG. 3) the moveable conductive element 117 has a cross-section of a rectangle with smoothly rounded corners, as shown in FIG. 4*a*. Preferably, when viewed from the front (i.e. along the first direction in the embodiment shown in FIG. 3) the moveable conductive element has a substantially oval shaped cross-section, as shown in FIG. 4*b*. The presence of sharp edges in the moveable conductive element could result in higher concentrations of electrical field strengths, and the provision of a moveable conductive element 117 having a smooth surface reduces the ratio between the highest peaks and average value of electrical field. Preferably, the moveable conductive element 117 is shaped such that the electric field strength in the vicinity of the bare disconnector 107 is less than the dielectric strength of air during predetermined lighting impulse and power frequency voltage conditions.

The discontinuity of the geometry at both ends of the moveable conductive element 117 of disconnector 107 can lead to electrical field concentration. In order to reduce the electric field strength at the end of the disconnector 107 to below the dielectric strength of air, disc-shaped field-controlling shields 114 are provided at both ends of the disconnector. The disc-shaped field-controlling shields 114 partly enclose the ends of the disconnector 107 and reduce the electrical field strength at both ends of the disconnector 107. Inside the insulating housing 102, the electrical field is low enough to avoid production of free electrons and does not lead to electrical breakdown.

Interaction of Conditions Inside and Outside the Insulation Housing

The plastic insulation housing 102 separates the area outside the insulating housing 102 (with high electrical fields and full insulation to prevent production of free electrons) from the area inside the housing 102 (with bare conductors and reduced electrical fields that are low enough to avoid production of free electrons). On the outside of the housing, the electrical field may be greater in some regions than the breakdown voltage of air and would cause breakdown if free electrons were available. However, this breakdown is avoided in the disclosed embodiments, because the production of free electrons is prevented outside of the housing (by insulation), and any free electrons which are produced inside of the housing are separated from other high field strength regions outside of the housing by the insulating housing, thus preventing free electrons produced inside the housing from forming an avalanche outside of the housing. As described in more detail above, the production of free electrons inside the housing is reduced as far as possible through avoidance of regions of high electric field strength.

By insulating the branch busbar 109 and insulated connection element 108, the electric field strength necessary for free electron production at these elements is increased in comparison with bare conductive elements. In particular, while free electrons are created at electrical field levels >30 kV/cm and when using bare conductors, the present invention reduces the creation of free electrons by insulating the phase busbars, Free electron production occurs at lower field strengths in the vicinity of triple junctions, where conductive materials, insulating materials and air meet. The embodiment of FIGS. 1-3 provide an arrangement with a low prevalence of triple junctions in comparison with known devices by entirely surrounding the conductive branch busbars 109 with an insulating material (to form insulated branch busbars), rather than mounting the conductive branch busbars on an insulating surface within an air-filled housing. This arrangement further avoids the production of free electrons in comparison with known devices and thereby reduces the likelihood of flashover events. Furthermore, by providing the branch busbars 109 outside of the insulating housing 102, the path length between the production point of free electrons at the branch busbars 109 and the grounded or low-voltage conductive elements within the insulating housing, such as the ground contact 113 or other elements, is increased. This increase in the path length further reduces the possibility of a flashover event even under conditions when the electric field strength at the branch busbar 109 is sufficient to cause production of free electrons. In order to reduce flashover events, a thinner plastic wall can be used for the air insulating housing, because only blocking of the path of free electrons is required rather than full insulation of the components within the housing 102. In some embodiments, the plastic wall may be less than 3 mm thick or, preferably, less than 1 mm thick The arrangement of branch busbars 109 on the outside of the insulating housing 102 provides a more compact housing design in comparison with apparatuses in which branch busbars 109 are disposed within the insulating housing 102. In multiphase switching systems, each branch busbar 109 extends from the disconnector 107 to a respective phase busbar 104 in a different direction. By providing a switching device 101 in which branch busbars 109 are arranged outside of the insulating housing 102, the housing 102 and the elements within the housing 102 may be identical for all three phases of the switching system 100. This allows provision of a multiphase switching system 101 that requires substantially simplified manufacturing processes in comparison to a multiphase switching system in which a housing has a different structure for each phase.

The above disclosure provides a switching apparatus and system with a compact design and simplified manufacturing process that reduces the likelihood of flashover events in lightening impulse conditions in comparison to known air-insulated switching devices. In particular, by isolating the branch busbars, the creation of free electrons at the branch busbars is reduced, and by bringing the branch busbars outside of the single insulated phase houses of the switching device, the path between free electron production at the branch busbars and earthed or low voltage elements is increased, as the insulated phase housing creates a barrier for the free electrons despite a high electrical field. The combination of reduction of free electron production at the branch busbars and increase of the path length between free electron production at the branch busbars and grounded elements reduces the likelihood of flashover events.

The invention claimed is:

1. An air-insulated switching apparatus comprising:

an insulating housing, the insulating housing comprising a housing wall;

a disconnector disposed inside the insulating housing and at least partially surrounded by the housing wall, the disconnector having a first end and a second end, wherein the first end of the disconnector receives power from a power supply;

an insulated branch busbar disposed outside the insulating housing, such that part of the housing wall is disposed between the disconnector and the insulated branch busbar;

an insulated connection element passing through the housing wall and connecting the second end of the disconnector to the insulated branch busbar; and an insulated phase busbar connected to the branch busbar.

2. The air-insulated switching apparatus of claim 1, wherein the insulated branch busbars comprise conductive busbars that are entirely surrounded by an insulating material.

3. The air-insulated switching apparatus of claim 2, wherein the disconnector comprises a moveable conductive element that forms a conductive path between the first and second ends of the disconnector when the moveable conductive element is in a closed position and which disconnects the first and second ends of the disconnector when the moveable conductive element is in an open position.

4. The air-insulated switching apparatus of claim 3, further comprising a ground contact disposed within the insulating housing and electrically connected to ground, wherein, when the disconnector is in the open position, the second end of the moveable conductive element is in contact with the ground contact.

5. The air-insulated switching apparatus of claim 4, further comprising a circuit breaking device disposed between the first end of the disconnector and the power supply.

6. The air-insulated switching apparatus of claim 5, wherein the circuit breaking device comprises a vacuum interrupter.

7. The air-insulated switching apparatus of claim 6, further comprising at least one shielding element disposed around an end of the disconnector.

8. The air-insulated switching apparatus of claim 7, wherein the housing is formed of a plastic material or epoxy.

9. The air-insulated switching apparatus of claim 8, wherein the insulated connection element comprises a bushing.

10. The air-insulated switching apparatus of claim 9, wherein the branch busbars are surrounded by an insulating thermoplastic elastomer material.

11. The air-insulated switching apparatus of claim 10, wherein the housing comprises an opening to allow air to flow into and out of the housing.

12. A switching system comprising a plurality of apparatuses each configured according to the apparatus of claim 1.

13. The switching system of claim 12, wherein the insulating housings of the respective switching apparatuses of the plurality of switching apparatuses all have the same shape.

14. The switching system of claim 13, wherein the branch busbars of the respective switching apparatuses of the plurality of switching apparatuses all have a different shape to each other.

15. The switching system of claim 14, wherein the branch busbars of the respective switching apparatuses of the plurality of switching apparatuses extend in mutually different directions.

16. The air-insulated switching apparatus of claim 5, further comprising an actuator configured to move the disconnector between a closed position and an open position, wherein the actuator is configured to move the disconnector to the open position after the circuit breaking device is moved to an open position of the circuit breaking device.

17. The air-insulated switching apparatus of claim 1, wherein the insulated connection element comprises a conductive element surrounded by a bushing, wherein the insulated branch busbar comprises a branch busbar and an insulating thermoplastic elastomer material entirely surrounding a conductive material of the branch busbar, and wherein the insulated phase busbar comprises a phase busbar and an insulating thermoplastic elastomer material entirely surrounding a conductive material of the branch busbar.

* * * * *